US011820944B2

United States Patent
Birkle et al.

(10) Patent No.: US 11,820,944 B2
(45) Date of Patent: Nov. 21, 2023

(54) METHODS FOR REMOVING SULFATE IONS FROM SEAWATER TO FORM INJECTION FLUIDS

(71) Applicant: Saudi Arabian Oil Company, Dhahran (SA)

(72) Inventors: Peter Birkle, Dhahran (SA); Yunjiao Fu, Republic of Singapore (SG)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/132,647

(22) Filed: Apr. 10, 2023

(65) Prior Publication Data

US 2023/0242807 A1 Aug. 3, 2023

Related U.S. Application Data

(62) Division of application No. 17/167,463, filed on Feb. 4, 2021, now Pat. No. 11,655,413.

(51) Int. Cl.
*C09K 8/84* (2006.01)
*B01D 17/02* (2006.01)
(Continued)

(52) U.S. Cl.
CPC .......... *C09K 8/845* (2013.01); *B01D 17/0214* (2013.01); *B01D 21/01* (2013.01);
(Continued)

(58) Field of Classification Search
None
See application file for complete search history.

(56) References Cited

U.S. PATENT DOCUMENTS 4,980,077 A * 12/1990 Morris ..................... C02F 5/08
510/480
5,093,020 A 3/1992 Paul et al.
(Continued)

FOREIGN PATENT DOCUMENTS

WO 2012087887 A2 6/2012

OTHER PUBLICATIONS

Bader, "Sulfate removal technologies for oil fields seawater injection operations", Journal of Petroleum Science & Engineering, vol. 55, pp. 93-110, 2007.

(Continued)

*Primary Examiner* — John J Figueroa
(74) *Attorney, Agent, or Firm* — DINSMORE & SHOHL LLP (57) ABSTRACT

According to one or more embodiments, sulfate ions may be removed from seawater to form an injection fluid by a method including passing the seawater and formation water to a mixing tank. The seawater may comprise sulfate ions. The formation water may comprise barium ions. The seawater and formation water may be passed to the mixing tank in a ratio determined by a computerized geochemical model. The method may further include mixing the seawater and formation water to form a mixed fluid and passing the mixed fluid to a clarifier, where a barium sulfate precipitate may be formed and at least a portion of the barium sulfate precipitate may be separated from the mixed fluid. The method may further include passing the mixed fluid to a microfiltration system, where at least a portion of the barium sulfate precipitate may be removed from the mixed fluid to form an injection fluid.

9 Claims, 3 Drawing Sheets

(51) Int. Cl.

| | | |
|---|---|---|
| *B01D 21/01* | (2006.01) | |
| *B01D 1/14* | (2006.01) | |
| *C02F 1/00* | (2023.01) | |
| *C02F 9/00* | (2023.01) | |
| *B01D 61/14* | (2006.01) | |
| *C02F 1/40* | (2023.01) | |
| *C02F 1/44* | (2023.01) | |
| *C02F 1/52* | (2023.01) | |
| *C02F 5/08* | (2023.01) | |
| *C02F 101/10* | (2006.01) | |
| *C02F 101/32* | (2006.01) | |
| *C02F 103/08* | (2006.01) | |
| *C02F 103/10* | (2006.01) | |

(52) U.S. Cl.
CPC .......... *B01D 61/147* (2013.01); *C02F 1/008* (2013.01); *C02F 9/00* (2013.01); *B01D 2311/2642* (2013.01); *C02F 1/40* (2013.01); *C02F 1/444* (2013.01); *C02F 1/5236* (2013.01); *C02F 5/08* (2013.01); *C02F 2101/101* (2013.01); *C02F 2101/32* (2013.01); *C02F 2103/08* (2013.01); *C02F 2103/10* (2013.01); *C02F 2209/06* (2013.01); *C02F 2209/10* (2013.01); *C02F 2209/29* (2013.01)

(56) References Cited

U.S. PATENT DOCUMENTS

| | | | | |
|---|---|---|---|---|
| 5,190,656 | A * | 3/1993 | Paul | E21B 43/28 |
| | | | | 210/698 |
| 5,200,117 | A * | 4/1993 | Morris | C02F 5/08 |
| | | | | 210/698 |
| 5,259,980 | A * | 11/1993 | Morris | C02F 5/10 |
| | | | | 510/435 |
| 6,613,899 | B1 | 9/2003 | Kuzee et al. | |
| 7,789,159 | B1 | 9/2010 | Bader | |
| 9,145,508 | B2 * | 9/2015 | Smith | C09K 8/74 |
| 10,501,680 | B2 | 12/2019 | Li et al. | |
| 10,579,025 | B2 | 3/2020 | Salino | |
| 2007/0246426 | A1 | 10/2007 | Collins | |
| 2011/0180477 | A1 | 7/2011 | Ganzi et al. | |
| 2016/0052814 | A1 | 2/2016 | Leyendecker et al. | |
| 2019/0225867 | A1 * | 7/2019 | Li | E21B 43/26 |

OTHER PUBLICATIONS

Bedrikovetsky et al., "Produced water re-injection with seawater treated by sulphate reduction plant injectivity decline, analytical model", Journal of Petroleum Science and Engineering, vol. 68, pp. 19-29, 2009.

Birkle, "Advances in geochemical modeling for geothermal applications", Geochemical Modeling of Groundwater, Vadose and Geothermal Systems. Chapter 7, p. 153-178, CRC Press, Taylor & Francis Group, London, UK, ISBN: 978-0-415-66810-1, 1996.

Kharaka et al., "Deep Fluids in Sedimentary Basins", Holland, H.D. and Turekian, K.K., Treatise on Geochemistry, 2nd edn, vol. 7, pp. 472-515, 2014, Elsevier, Amsterdam, Netherlands.DOI: 10.1016/B978-0-08-095975-7.00516-7.

Parkhurst, "Description of input and examples for PHREEQC version 3—A computer program for speciation, batch-reaction, one-dimensional transport, and inverse geochemical calculations", volume book 6 series Techniques and Methods, 2013, http://pubs.usgs.gov/tm/06/a43.

Plummer, "Application of the Pitzer equations to the PHREEQC geochemical model", In: Chemical Modeling of Aqueous Systems II, ACS Symposium Series vol. 416, Chapter 10, p. 128-137, 1990, ISBN13: 9780841217294, eISBN: 9780841212725, DOI: 10.1021/bk-1990-0416.ch010.

Vanberk et al., "Temporal and spatial development of scaling in reservoir aquifers triggered by seawater injection: Three-dimensional reactive mass transport modeling of water-rock-gas interactions", Journal of Petroleum and Science Engineering, vol. 135, pp. 206-217, 2015.

Vu et al., "Eliminating the Need for Scale Inhibition Treatments for Elf Exploration Angola's Girassol Field", Science of Petroleum Engineers, SPE60220, 2000, 10 pages.

Zularisam et al., "Application and Challenges of Membrane in Surface Water Treatment", Journal of Applied Sciences, vol. 10, No. 5, pp. 380-390, 2010, ISSN1812-5654.

International Search Report and Written Opinion dated Sep. 23, 2021 pertaining to International Application No. PCT/US2021/033075, filed May 19, 2021, 17 pages.

Fu et al., "Hydrogeochemical modelling of fluid-rock interactions triggered by seawater injection into oil reservoirs: Case study Miller field (UK North Sea)", Applied Geochemistry, Pergamon, Amsterdam, NL, vol. 27, No. 6, Mar. 3, 2012, pp. 1266-1277.

* cited by examiner

METHODS FOR REMOVING SULFATE IONS FROM SEAWATER TO FORM INJECTION FLUIDS

CROSS-REFERENCE TO RELATED APPLICATION

This application is a divisional application of U.S. patent application Ser. No. 17/167,463 filed on Feb. 4, 2021, the entire disclosure of which is incorporated by reference herein.

TECHNICAL FIELD

Embodiments of the present disclosure generally relate to separation methods, more specifically, to methods for removing ions from aqueous solutions.

BACKGROUND

Enhanced oil recovery is used to increase the recovery of hydrocarbons from a reservoir. During enhanced oil recovery, seawater may be injected into the reservoir to maintain reservoir pressure. However, seawater, generally, is rich in sulfates and may be incompatible with formation water within the reservoir, resulting in the formation of scale. Barite is one of the most common scale minerals and can cause a significant reduction in hydrocarbon production by coating perforations, casings, production tubulars, valves, pumps, and downhole completion equipment.

SUMMARY

Sulfate ions may be removed from seawater to produce an injection fluid that avoids the formation of scale. Conventional methods for removing sulfate ions from seawater include the use of nanofiltration to filter the sulfate ions from the seawater. However, nanofiltration systems are expensive to operate and maintain due to the relatively high cost of membranes, high pressures required during the filtration, and high energy cost. Thus, there is a need for improved methods for removing sulfate ions from seawater.

Embodiments of the present disclosure address this need and are directed to methods for removing sulfate ions from seawater. According to some embodiments, seawater and formation water may be mixed prior to the injection of seawater into a reservoir. This mixing may result in the production of barite and other sulfate minerals, which may precipitate from the solution of seawater and formation water. This precipitate may be removed from the mixture by microfiltration. The use of microfiltration may provide benefits over the conventional nanofiltration methods, because microfiltration generally has a higher recovery of product, operates at lower pressures, uses less costly membranes, and requires less energy to operate than conventional nanofiltration processes. Thus, according to one or more embodiments, improved methods to remove sulfate ions from seawater may include mixing seawater with formation water and removing barite precipitates by microfiltration.

Additionally, the volume of formation water produced from a reservoir increases constantly during oil and gas extraction. Produced formation water from exploration and producing wells is one of the largest wastewater sources apart from drilling fluids and fracking fluids. After treatment, reinjection of the produced formation water into the reservoir is a common method to dispose wastewater. As such, there is a need to reduce the amount of formation water that requires disposal.

Embodiments of the present disclosure address this need by using produced formation water to remove sulfate ions from seawater prior to the injection of seawater into the reservoir. This use for the produced formation water may reduce the amount of formation water that must be treated and disposed as wastewater. Thus, one or more embodiments disclosed herein for reducing the sulfate concentration of seawater may also reduce the cost of treating and disposing produced formation water as wastewater.

According to one or more embodiments, sulfate ions may be removed from seawater to form an injection fluid by a method comprising passing the seawater and formation water to a mixing tank. The seawater may comprise sulfate ions. The formation water may comprise barium ions. The seawater and formation water may be passed to the mixing tank in a ratio determined by a computerized geochemical model. The method may further comprise mixing the seawater and formation water to form a mixed fluid and passing the mixed fluid to a clarifier, wherein a barium sulfate precipitate may be formed and at least a portion of the barium sulfate precipitate may be separated from the mixed fluid. The method may further comprise passing the mixed fluid to a microfiltration system, wherein at least a portion of the barium sulfate precipitate may be removed from the mixed fluid to form an injection fluid.

According to one or more embodiments, an injection fluid may be produced by a method comprising analyzing samples of seawater and samples of formation water to determine a composition of the seawater and a composition of the formation water; analyzing samples of reservoir rock to determine a composition of the reservoir rock; and simulating an interaction of seawater, formation water, and reservoir rock using a computerized geochemical model to determine whether there is a potential for barite scale formation within a reservoir. If there is a potential for barite scale formation within the reservoir, the method may further comprise removing sulfate ions from the seawater by a method comprising mixing the seawater and formation water to form a mixed fluid. The seawater and formation water may be mixed in a ratio determined by the computerized geochemical model. The method may further comprise passing the mixed fluid to a clarifier, wherein sulfate minerals precipitate from the mixed fluid within the clarifier and the sulfate minerals comprise barite. Additionally, the method may comprise filtering at least a portion of the sulfate minerals from the mixed fluid to form an injection fluid, wherein the filtering occurs in a microfiltration system.

Additional features and advantages of the described embodiments will be set forth in the detailed description which follows, and in part will be readily apparent to those skilled in the art from that description or recognized by practicing the described embodiments, including the detailed description which follows and the claims.

BRIEF SUMMARY OF THE DRAWINGS

The following detailed description of specific embodiments of the present disclosure can be best understood when read in conjunction with the following drawings, where like structure is indicated with like reference numerals and in which.

DETAILED DESCRIPTION

The detailed description discloses one or more embodiments relevant to the appended claims. One or more embodiments of the present disclosure are directed to methods for removing sulfate ions from seawater to form an injection fluid. Such embodiments may include determining whether sulfate ions should be removed from the seawater and, if so, what ratio of seawater to formation water, when mixed, will remove a sufficient amount of sulfate ions from the seawater to prevent the formation of scale within the reservoir.

Definitions

As described herein, "enhanced oil recovery" may refer to a method or process for extracting hydrocarbons from a reservoir. In one or more embodiments, enhanced oil recovery may include injecting an injection fluid into a reservoir and recovering hydrocarbons from the reservoir. In one or more embodiments, the hydrocarbons may comprise crude oil and the injection fluid may comprise seawater.

The term "seawater" may refer to naturally occurring salt water obtained from a sea, ocean, or similar body of water. Generally, seawater has a salinity between 31 ppt and 39 ppt, with an open ocean average of about 35 ppt. Additionally, sulfate ions may be present in seawater in average concentrations of about 2,700 mg/L; however, higher concentrations of sulfate ions are possible in areas with high rates of evaporation, such as the Arabian Gulf. Furthermore, seawater may comprise an average magnesium content of about 1,262 mg/L with elevated concentrations of up to 2,348 mg/L for the Arabian Gulf. In one or more embodiments, seawater may be obtained from a natural source and may be untreated, or minimally treated before use in the presently described methods. For example, seawater may be subjected to debris removal before being used in the presently described methods.

As described herein, "formation water" may refer to water that occurs naturally within the pores of a rock formation. The salinity of the formation water may range from 5,000 mg/L to 300,000 mg/L. Typical salts in formation water include NaCl, and NaCaCl; however, formation water is not limited to water comprising these salts. Generally, the concentration of sulfate ions in the formation water rarely exceeds 500 mg/L due to reduced conditions within the reservoir. The salinity and other compositional properties of formation water may vary greatly from reservoir to reservoir. Without wishing to be bound by theory, it is believed that there is no uniform mixing ratio of formation water to seawater that will result in an injection fluid sufficiently low in sulfate ions to prevent the formation of scale within the reservoir.

The term "injection fluid" may refer to a fluid injected into a reservoir. Injection fluid may be injected into a reservoir during an enhanced oil recovery process to pressurize the reservoir and displace hydrocarbons from the reservoir. Generally, injection fluid may comprise seawater. According to embodiments described herein, it may be desirable for the injection fluid to have a concentration of sulfate ions low enough that sulfate minerals do not precipitate and form scale within the reservoir or related processing equipment.

As described herein, "a computerized geochemical model" may refer to a package of software and data that may be used to simulate the environment within a reservoir using parameters input by a user. Suitable computerized geochemical models for use in the presently disclosed embodiments may include PHREEQC from the U.S. Geological Survey and the Geochemist's Workbench from Aqueous Solutions LLC. Additional suitable computerized geochemical models are described in detail in, for example, "Geochemical Modeling of Groundwater, Valdose and Geothermal Systems" Chapter 7, by Peter Birkle, 2012, which is incorporated by reference herein. According to one or more embodiments described herein, a computerized geochemical model may be used to determine whether the formation of scale is likely when seawater is injected into a reservoir, and if so, the ratio of seawater to formation water that, when mixed, produce an injection fluid that will not result in scale formation within the reservoir.

As described herein, "scale" may refer to a mineral deposit that may form on the surface of rock, metal, or other material. In enhanced oil recovery processes, scale may form within the reservoir, obstructing pores or perforations within the reservoir rock and reducing the ability of hydrocarbons to be recovered from the reservoir. Various types of scale may form from compounds that are insoluble or slightly soluble in water. According to embodiments of the present disclosure, "scale" may refer to sulfate minerals, including but not limited to calcium sulfate ($CaSO_4$), barium sulfate ($BaSO_4$), and strontium sulfate ($SrSO_4$).

The term "average diameter" may refer to the mean of the diameters of a certain group of particles. In one or more embodiments, the particles may not be perfectly spherical. In such embodiments, the diameter of a particle may be approximated for the purpose of determining an average diameter of the group of particles.

The term "substantially free of" may refer to the lack of a particular constituent in a composition. For example a composition may be substantially free of a constituent when the composition comprises less than 0.1 wt. %, less than 0.01 wt. % or even less than 0.001 wt. % of the constituent. In one or more embodiments, a composition may be substantially free of a constituent when the presence of the constituent in the composition does not appreciably alter the properties of the composition. In one or more embodiments, a composition may be substantially free of a constituent when the composition is void of the constituent.

As described herein, the term "microfiltration" may refer to a pressure-driven separation process, which may be used in concentrating, purifying, or separating macromolecules, colloids, and suspended particles from solution. Microfiltration membranes typically have nominal pore sizes on the order of 0.1-1.0 μm. For example, microfiltration processing may be used in the food industry for applications such as wine, juice, and beer clarification, for wastewater treatment, and plasma separation from blood for therapeutic and commercial uses.

Methods for Removing Sulfate Ions from Seawater

Generally, methods for removing sulfate ions from seawater to form injection water may comprise determining whether sulfate ions should be removed from the seawater to prevent the formation of scale. In one or more embodiments, this determination may be accomplished using a computerized geochemical model.

Figure 1:
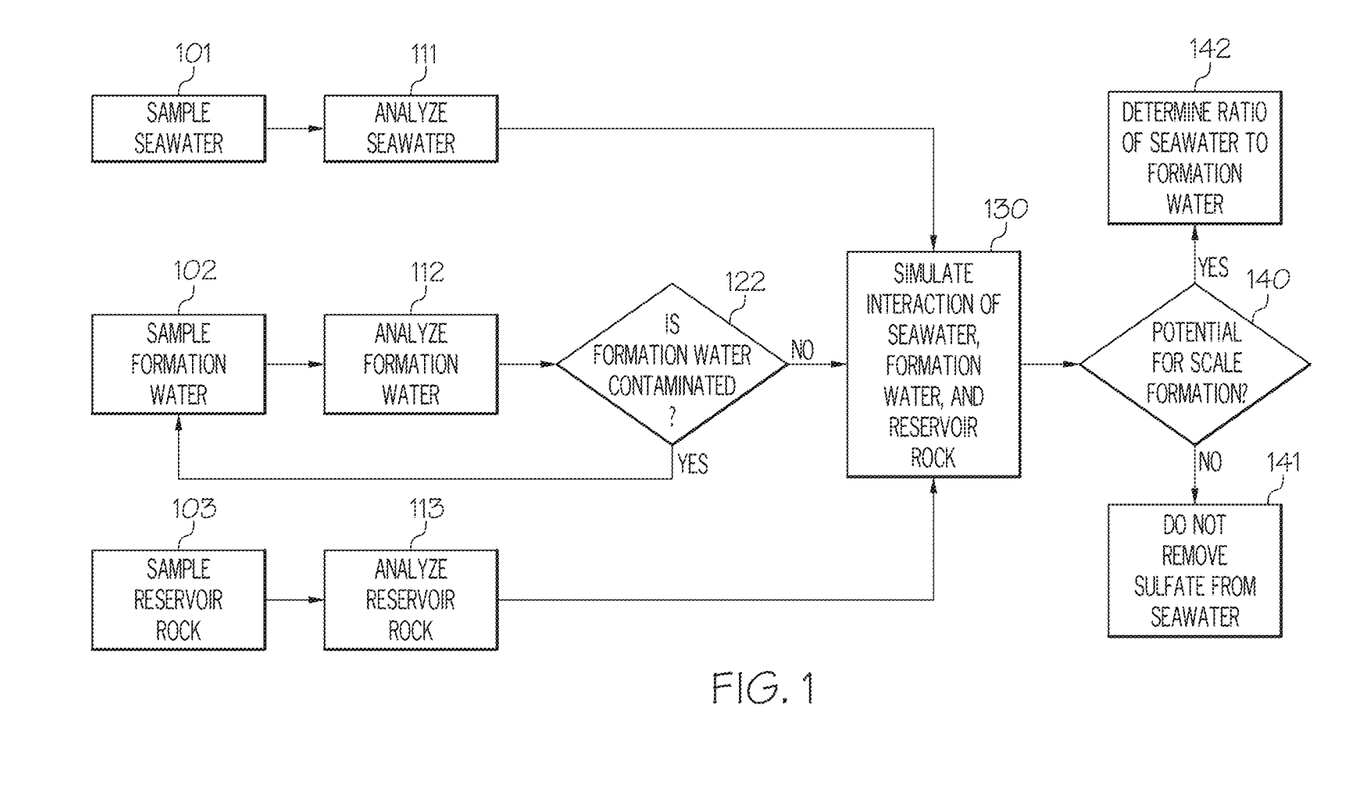
FIG. 1 is a flow chart depicting a method for determining whether sulfate ions should be removed from seawater according to one or more embodiments described in this disclosure.

Referring now to FIG. 1, methods of determining whether sulfate ions should be removed from seawater include sampling seawater 101, sampling formation water 102, and sampling reservoir rock 103. Sampling the seawater 101 may be accomplished by any suitable means, including by sampling the seawater's source, sampling seawater within a seawater collection system, or sampling seawater within a seawater treatment facility. Likewise, sampling the formation water 102 may be achieved by any suitable means, including by retrieving formation water exiting a reservoir or sampling formation water located within a reservoir. Sampling reservoir rock 103 may be accomplished by any suitable means, including by drilling into the reservoir to retrieve reservoir rock samples in the form of core plugs.

Methods for determining whether sulfate ions should be removed from seawater include analyzing the seawater samples 111, analyzing the formation water samples 112, and analyzing the reservoir rock samples 113. In one or more embodiments, the seawater and formation water samples may be analyzed to determine their composition and chemical and physical properties. For example, analysis of the seawater 111 and analysis of the formation water 112 may include determining the pH, conductivity, salinity, and total dissolved solids of the seawater, formation water, or both. Additionally, determining the composition of the seawater and formation water may include determining a concentration of one or more of sodium, calcium, magnesium, potassium, strontium, barium, aluminum, boron, lithium, iron, chloride, bicarbonate, and sulfate in the samples of seawater, formation water, or both. In one or more further embodiments, analyzing the seawater samples 111 and analyzing the formation water samples 112 may include performing any suitable analyses necessary to obtain information required by the geochemical model.

In one or more embodiments, analyzing the reservoir rock 113 may include performing X-ray diffraction analysis, X-ray fluorescence analysis, and scanning electron microscopy of the samples of reservoir rock. In one or more embodiments, these analyses may be used to determine the composition and structure of the reservoir rock. In one or more further embodiments, analyzing the reservoir rock 113 may include performing any suitable analyses necessary to obtain information required by the geochemical model.

Without wishing to be bound by theory, it is believed that when more information regarding the composition and physical properties of the seawater, formation water, and reservoir rock are supplied to the computerized geochemical model, the computerized geochemical model will be able to provide more accurate results when simulating the interaction between the seawater, the formation water, and the reservoir rock.

In one or more embodiments, the formation water sample may be contaminated and may not provide an accurate representation of the formation water within the reservoir. Generally, formation water is sampled as it exits the wellbore, where the formation water may encounter operational fluids. In one or more embodiments, the formation water sample could be contaminated by drilling fluid, completion brine, stimulation acid, or combinations of these as it exits the reservoir.

Referring to FIG. 1, the method for determining whether to remove sulfate ions from the seawater may include determining whether the formation water sample is contaminated 122. In one or more embodiments, determining whether the formation water sample is contaminated 122 may include analyzing the type of salt dissolved in the formation water and analyzing the pH of the formation water. For example, formation water typically comprises NaCl or NaCaCl salts. In one or more embodiments, if ionic charge balance error is less than 10%, less than 9%, less than 8%, less than 7%, or even less than 5%, then the formation water may not be contaminated. In one or more embodiments, if the relative concentration of sodium is greater than 40%, greater than 50%, or even greater than 60% of equilibrium than the formation water may not be contaminated. In one or more embodiments, if the relative concentration of chlorine is greater than 50%, greater than 60% or even greater than 70%, then the formation water may not be contaminated. In one or more embodiments, if the concentration of potassium is less than 2,200 mg/L, less than 2,100 mg/L, less than 2,000 mg/L, less than 1,900 mg/L, or even less than 1,800 mg/L, then the formation water may not be contaminated. In one or more embodiments, if the concentration of $HCO_3$ is less than 1,200 mg/L, less than 1,100 mg/L, less than 1,000 mg/L, less than 900 mg/L, or even less than 800 mg/L, then the formation water may not be contaminated. In one or more embodiments, if the concentration of $SO_4$ is less than 600 mg/L, less than 500 mg/L, or even less than 400 mg/L, then the formation water may not be contaminated. In one or more embodiments, the pH of uncontaminated formation water may range from 4.5 to 7.5. For example, the pH of uncontaminated formation water may be from 4.5 to 5.0, from 5.0 to 5.5, from 5.5 to 6.0, from 6.0 to 6.5, from 6.5 to 7.0, from 7.0 to 7.5, or any combination or sub-combination of those ranges. If the formation water sample is contaminated, then the steps of sampling the formation water 102 and analyzing the formation water 112 may be repeated until an uncontaminated sample of formation water is obtained and analyzed.

Once the samples of seawater, formation water, and reservoir rock have been analyzed, then a computerized geochemical model may be used to simulate the interaction between the seawater, formation water, and reservoir rock 130 within the reservoir. The computerized geochemical model may use the composition and physical property data obtained from analyzing the seawater 111, analyzing the formation water 112, and analyzing the reservoir rocks 113 to determine whether there is a potential for scale formation within the reservoir 140. In one or more embodiments, the computerized geochemical model may calculate a simulated saturation index for various salts or minerals. Simulated saturation index values above 0 generally indicate that the salt or mineral is oversaturated and will tend to precipitate out of the solution. Likewise, simulated saturation index values below 0 indicate that the salt or mineral will likely remain dissolved in the solution. As such, when the simulated saturation index is above 0 there is a potential for scale formation within the reservoir and when the simulated saturation index is below 0 there is no potential for scale formation within the reservoir.

Referring to FIG. 1, if the computerized geochemical model determines that there is no potential for scale formation within the reservoir, then sulfate ions do not need to be removed from the seawater 141. In such embodiments, the seawater may be injected into a reservoir during enhanced oil recovery as an injection fluid.

If the computerized geochemical model determines that there is potential for scale formation within the reservoir, then the computerized geochemical model may be used to determine a ratio of seawater to formation water 142 that may be used to form an injection fluid that will not result in scale formation within the reservoir and the borehole. Due to the differences in seawater composition, formation water composition, reservoir rock composition, and reservoir conditions, there is no uniform or general ratio of seawater to formation water that will guarantee that the injection fluid does not produce scale within any reservoir. Additionally, the composition of formation water may change over the life of a reservoir. Thus, analyzing the potential for scale formation within the reservoir using a computerized geochemical model may be performed on a periodic basis over the life of the reservoir. For example, determining the potential for scale formation 140 may occur every day, every week, twice a month, every month, every 2 months, every 3 months, every 4 months, every 6 months or even every year.

In one or more embodiments, the results of the computerized geochemical model may be confirmed by laboratory experiments. For example, samples of seawater and formation water may be mixed under various conditions to determine the potential for scale formation within the reservoir. If the experimentally determined potential for scale formation is within 10% of the potential for scale formation determined by the computerized geochemical model then the experimental results confirm the results of the computerized geochemical model. Additionally, the results of the computerized model may be confirmed by laboratory experiments when both the computerized model and the laboratory experiments both result in sulfate concentrations below 100 mg/L in the mixed fluid.

Figure 2:
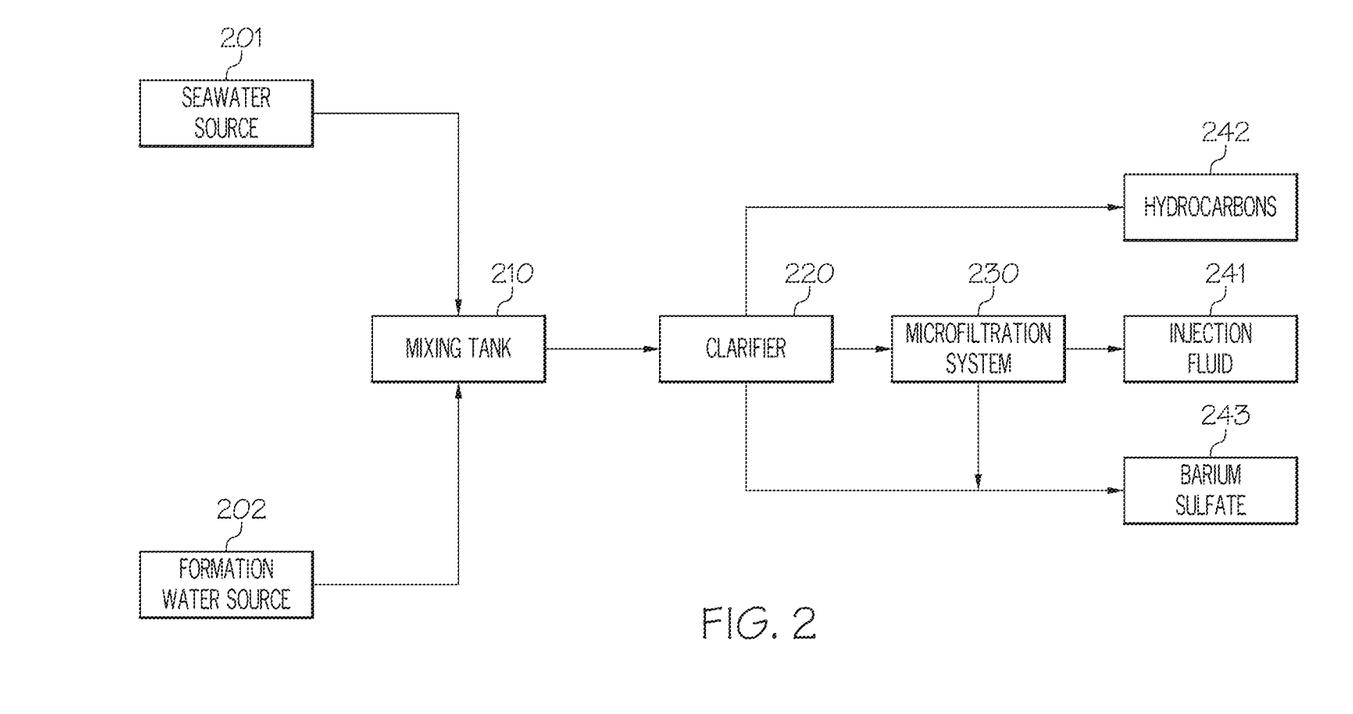
FIG. 2 is a flow chart depicting a method for removing sulfate ions from seawater according to one or more embodiments described in this disclosure.

Referring now to FIG. 2, the method for removing sulfate ions from seawater may include passing seawater from a seawater source 201 to a mixing tank 210. In one or more embodiments, the seawater source may be a natural seawater source, such as an ocean, sea, or similar body of water, a seawater treatment facility, or any tank or vessel suitable for holding seawater. The method may also include passing formation water from a formation water source 202 to the mixing tank 210. The formation water source may be any suitable source of formation water including a reservoir or any tank or vessel suitable for storing formation water. In one or more embodiments, the seawater and formation water may be passed to the mixing tank 210 in a ratio determined by the computerized geochemical model to produce an injection fluid that will not result in scale formation within the reservoir.

In one or more embodiments, the concentration of sulfate ions in the seawater is greater than 2000 mg/L. For example, the concentration of sulfate ions in the seawater may be greater than 2000 mg/L, greater than 2200 mg/L, greater than 2400 mg/L, greater than 2600 mg/L, greater than 2800 mg/L, greater than 3000 mg/L, greater than 3200 mg/L, greater than 3400 mg/L, greater than 3600 mg/L, greater than 3800 mg/L, greater than 4000 mg/L, greater than 4200 mg/L, greater than 4400 mg/L, greater than 4600 mg/L, or even greater than 4800 mg/L.

The concentration of barium ions in the seawater may be less than 5 mg/L in one or more embodiments. For example the concentration of barium ions in the seawater may be less than 5 mg/L, less than 4.5 mg/L, less than 4.0 mg/L, less than 3.5 mg/L, less than 3.0 mg/L, less than 2.5 mg/L, less than 2.0 mg/L, less than 1.5 mg/L, or even less than 1.0 mg/L. In further embodiments, the seawater may be substantially free of barium ions.

In one or more embodiments, the concentration of sulfate ions in the formation water may be less than 500 mg/L. For example, the concentration of sulfate ions in the formation water may be less than 500 mg/L, less than 400 mg/L, less than 300 mg/L, less than 200 mg/L, less than 100 mg/L, less than 80 mg/L, less than 60 mg/L, less than 40 mg/L, less than 30 mg/L, less than 20 mg/L, or even less than 10 mg/L. In further embodiments, the formation water may be substantially free of sulfate ions.

The concentration of barium ions in the formation water may be greater than 100 mg/L in one or more embodiments. For example, the concentration of barium ions in the formation water may be greater than 100 mg/L, greater than 200 mg/L, greater than 300 mg/L, greater than 400 mg/L, greater than 500 mg/L, greater than 600 mg/L, greater than 700 mg/L, or even greater than 800 mg/L.

Without wishing to be bound by theory, it is believed that the sulfate ions are removed from the seawater when the seawater and formation water are mixed and sulfate ions in the seawater and barium ions in the formation water form barium sulfate. The barium sulfate then precipitates from the mixture of seawater and formation water, effectively removing the sulfate ions from the mixture. Thus, it is advantageous for the formation water to have a higher concentration of barium ions than the seawater and a lower concentration of sulfate ions than the seawater.

Additionally, the methods presently disclosed may be effective when the concentration of sulfate ions in the seawater and concentration of barium ions in the formation water is outside of the ranges described hereinabove. The concentrations described herein simply represent preferred ranges of concentrations of sulfate ions and barium ions in the seawater and formation water and should not be construed as limiting on the scope of the claims, unless such a range is specifically recited in a claim. It should also be noted, that the seawater and formation water may comprise additional ions that may interact with sulfate ions to form various precipitates as described in further detail herein.

In one or more embodiments, the mixing tank 210 may be any suitable vessel for mixing seawater and formation water. The mixing tank 210 may comprise any suitable agitator, including one or more motor driven impellers. In one or more embodiments, the mixing tank 210 and its components, such as an agitator, may comprise corrosion resistant materials, such as stainless steels or plastics that are not damaged by contacting seawater.

The seawater and formation water may be mixed in the mixing tank 210 to form a mixed fluid. In one or more embodiments, the mixed fluid comprises seawater and formation water in a ratio determined by the computerized geochemical model. In further embodiments, the mixed fluid may be substantially free from additives, including but not limited to trace concentrations of drilling fluids, completion brines, and stimulation acid. As such, the mixed fluid may consist essentially of, or consist of, seawater and formation water.

The residence time of the mixed fluid within the mixing tank 210 may be from 0.1 to 1.0 hrs. For example, the residence time of the mixed fluid within the mixing tank 210 may be from 0.1 to 1.0 hours, from 0.2 to 1.0 hours, from 0.3 to 1.0 hours, from 0.4 to 1.0 hours, from 0.5 to 1.0 hours, from 0.6 to 1.0 hours, from 0.7 to 1.0 hours, from 0.8 to 1.0 hours, from 0.9 to 1.0 hours, from 0.1 to 0.9 hours, from 0.1 to 0.8 hours, from 0.1 to 0.7 hours, from 0.1 to 0.6 hours, from 0.1 to 0.5 hours, from 0.1 to 0.4 hours, from 0.1 to 0.3 hours, or even from 0.1 to 0.2 hours. Without wishing to be bound by theory, it is believed that sulfate minerals may precipitate from the mixed fluid quickly. Thus, a shorter residence time in the mixing tank 210 may be desirable.

Sulfate minerals may form when the seawater and formation water are mixed in the mixing tank 210. In one or more embodiments, the sulfate minerals may include barite (barium sulfate), celestite, and gypsum. Without wishing to be bound by theory, it is believed that sulfate ions present in the seawater and various ions present in the formation water may combine to form sulfate minerals. In one or more embodiments, sulfate ions from the seawater and barium ions from the formation water may form barium sulfate when the seawater and formation water are mixed. Additionally, sulfate ions in the seawater and strontium ions in the formation water may form celestite, and sulfate ions in the seawater and calcium ions in the formation water may form gypsum when the seawater and formation water are mixed. The formation of these sulfate minerals may facilitate the removal of sulfate ions from the seawater, so that the seawater may be used as an injection fluid for enhanced oil recovery.

Still referring to FIG. 2, the mixed fluid may be passed from mixing tank 210 to a clarifier 220. In one or more embodiments, at least a portion of the sulfate minerals may precipitate from the mixed fluid in the clarifier 220, and the clarifier 220 may be configured to remove settled sulfate minerals from the mixed fluid in either a continuous or batch mode. In one or more embodiments, coagulation or flocculation agents may be added to the mixed fluid in the clarifier to increase the separation of sulfate mineral particles from the mixed fluid. In alternative embodiments, the mixed fluid may be substantially free of coagulation or flocculation agents while in the clarifier 220.

In one or more embodiments, formation water may comprise hydrocarbons, and thus, the mixed fluid may further comprise hydrocarbons in such embodiments. These hydrocarbons may be separated from the mixed fluid in the clarifier 220. In one or more embodiments, the hydrocarbons may be less dense than the aqueous portion of the mixed fluid, and the hydrocarbons may form a hydrocarbon phase above the aqueous portion of the mixed fluid in the clarifier 220. The hydrocarbon phase may be separated from the aqueous portion of the mixed fluid. For example, the clarifier may comprise a skimmer or one or more weirs to remove hydrocarbons from the mixed fluid. The hydrocarbons separated from the mixed fluid 242 may be collected for further processing or for disposal.

In one or more embodiments, the residence time of the mixed fluid in the clarifier 220 is from 1.0 to 24 hours. For example, the residence time of the mixed fluid within the clarifier 220 may be from 1.0 to 24 hours, from 1.0 to 22 hours, from 1.0 to 20 hours, from 1.0 to 18 hours, from 1.0 to 16 hours, from 1.0 to 14 hours, from 1.0 to 12 hours, from 1.0 to 10 hours, from 1.0 to 8.0 hours, from 1.0 to 6.0 hours, from 1.0 to 4.0 hours, or even from 1.0 to 2.0 hours. In further examples, the residence time of the mixed fluid within the clarifier 220 may be from 3.0 to 24 hours, from 5.0 to 24 hours, from 7.0 to 24 hours, from 9.0 to 24 hours, from 11 to 24 hours, from 13 to 24 hours, from 15 to 24 hours, from 17 to 24 hours, from 19 to 24 hours, from 21 to 24 hours, from 23 to 24 hours, or for any combination or sub-combination of these ranges.

Sulfate minerals that precipitate from the mixed fluid in the clarifier 220 may be collected and processed for use in other applications. In one or more embodiments, barium sulfate 143 may be collected and stored for use as a weighting agent in drilling fluids. As such, barium sulfate 143, or barite, may be a useful byproduct of the presently described methods for removing sulfate ions from seawater.

In one or more embodiments, at least a portion of the sulfate minerals may not be separated from the mixed fluid in the clarifier. These sulfate minerals may have an average diameter from 3 μm to 8 μm. For example the sulfate minerals may have an average diameter from 3 μm to 8 μm, from 4 μm to 8 μm, from 5 μm to 8 μm, from 6 μm to 8 μm, from 7 μm to 8 μm, from 3 μm to 7 μm, from 3 μm to 6 μm, from 3 μm to 5 μm, or even from 3 μm to 4 μm. In one or more embodiments, the sulfate minerals may have an average diameter that is even smaller than 3 μm. Without wishing to be bound by theory, the average diameter of the sulfate minerals allows the sulfate minerals to be separated from the mixed fluid by microfiltration.

In one or more embodiments, the mixed fluid including at least a portion of the sulfate minerals may be passed from the clarifier 220 to a microfiltration system 230. The microfiltration system 230 may be any suitable microfiltration system 230 capable of removing solids having an average diameter from 3 μm to 8 μm as previously described. In one or more embodiments, microfiltration membranes with pore sizes from 0.1 μm to 1.0 μm may allow filtering of particle s having an average diameter from 3 μm to 8 μm, or even smaller particles.

In one or more embodiments, the microfiltration system 230 may operate at a pressure from 0.3 bar to 2.1 bar. For example, the microfiltration system may operate at a pressure from 0.3 bar to 2.1 bar, from 0.5 bar to 2.1 bar, from 0.7 bar to 2.1 bar, from 0.9 bar to 2.1 bar, from 1.1 bar to 2.1 bar, from 1.3 bar to 2.1 bar, from 1.5 bar to 2.1 bar from 1.7 bar to 2.1 bar, or even from 1.9 bar to 2.1 bar. In further examples, the microfiltration system may operate at a pressure from 0.3 bar to 1.9 bar, from 0.3 bar to 1.7 bar, from 0.3 bar to 1.5 bar, from 0.3 bar to 1.3 bar, from 0.3 bar to 1.1 bar, from 0.3 bar to 0.9 bar, from 0.3 bar to 0.7 bar or even from 0.3 bar to 0.5 bar. Generally, operating the microfiltration system 230 at a lower pressure corresponds to a lower energy cost for operating the microfiltration system 230.

In one or more embodiments, at least 90 wt. % of the mixed fluid may pass through the micro-filter as a permeate. For example, at least 90 wt. %, at least 92 wt. %, at least 94 wt. %, at least 96 wt. %, or even at least 98 wt. % of the mixed fluid may pass through the micro-filter as a permeate. Such permeate may be passed from the microfiltration system as an injection fluid 241 suitable for use in enhanced oil recovery.

The retentate, material that did not pass through the micro-filter, may comprise sulfate minerals, including barium sulfate. As previously described, the sulfate minerals may be further processed and barium sulfate 243 may be collected for use as a weighting agent in drilling fluids or in other applications. In one or more embodiments, the retentate may include at least 90% of the sulfate minerals that enter the microfiltration system in the mixed fluid. For example, the retentate may include at least 90%, at least 95%, at least 97%, at least 99% or even at least 99.9% of the sulfate minerals that enter the microfiltration system in the mixed fluid. As such, in further embodiments, the injection fluid 241 may be substantially free of sulfate minerals, including barium sulfate.

Additionally, the injection fluid 241 may have a concentration of sulfate ions below the concentration of sulfate ions that would result in the formation of scale in the reservoir, as determined by the computerized geochemical model. In one or more embodiments, the concentration of sulfate ions in the injection fluid may be less than 100 mg/L. For example, the concentration of sulfate ions in the injection fluid may be less than 100 mg/L, less than 80 mg/L, less than 60 mg/L, less than 40 mg/L, or even less than 20 mg/L. In one or more additional embodiments, the injection fluid may be substantially free from sulfate ions. Without being bound by theory, it is believed that the injection fluid produced using the presently described methods will not form scale in the form of sulfate bearing minerals, including barite, celestite, or gypsum, when injected into a reservoir during an enhanced oil recovery process.

Furthermore, without wishing to be bound by theory, it is believed that injection fluid formed by the presently described methods may improve the reservoir rock properties when the injection fluid is used in an enhanced oil recovery process. In one or more embodiments, removing the sulfate ions from the injection fluid may result in an undersaturated injection fluid, which may dissolve calcite ($CaCO_3$) and strontianite ($SrCO_3$) from the reservoir rocks when it is injected into the reservoir. The dissolution of such minerals may result in improved reservoir rock properties, which may lead to improved hydrocarbon recovery during an enhanced oil recovery process.

EXAMPLES

The examples are representative of embodiments of the presently disclosed subject matter, and are not meant as limiting the scope of the claims.

Example 1—Removal of Sulfate Ions from Seawater

Twenty liters of seawater were sampled from the Arabian Gulf at the shore of the Half Moon Bay in the Eastern Province, Saudi Arabia. The seawater was analyzed and the chemical composition of the seawater is displayed in Table 1. Notably, the seawater was enriched in sulfates and barium in comparison to global surface seawater. Specifically, the seawater sample contained 4,922 mg/L of sulfates and 1 mg/L of barium while global seawater usually comprises 2,700 mg/L of sulfates and 0.008 mg/L of barium.

TABLE 1

| Parameter | Seawater (Arabian Gulf) | Formation water Sample 1 | Formation water Sample 2 | Synthetic water formation | Post experiment-mixed fluid |
|---|---|---|---|---|---|
| pH | 8.2 | 3.3 | 2.5 | 6.6 | 7.5 |
| Temp (° C.) | 23 | 23 | 23 | 23 | 23 |
| TDS (mg/L) | 59,878 | 111,081 | 154,017 | 134,959 | 106,104 |
| $Ca^{+2}$ (mg/L) | 695 | 11,560 | 16,115 | 15,237 | 9,598 |
| $Mg^{+2}$ (mg/L) | 2,348 | 954 | 1,262 | <1 | 811 |
| $Na^+$ (mg/L) | 19,895 | 30,523 | 39,230 | 38,081 | 30,628 |
| $K^+$ (mg/L) | 671 | 1137 | 1750 | <10 | 250 |
| $Cl^-$ (mg/L) | 32,018 | 67,944 | 97,310 | 81,540 | 63,931 |
| Alkalinity | 160 | 0 | 0 | n.a. | n.a. |
| $SO_4^{-2}$ (mg/L) | 4,922 | <100 | <100 | <100 | 1136 |
| $Ba^{+2}$ (mg/L) | 1 | 305 | 806 | 592 | <1 |
| $Sr^{+2}$ (mg/L) | 13 | 1069 | 1,532 | 1,287 | 681 |

Two samples of formation water were obtained having barium concentrations of 305 mg/L and 806 mg/L. Sulfate concentrations of below 100 mg/L were observed in both formation water samples. The chemical compositions of the formation water samples are displayed in Table 1. Due to the limited volume of the formation water samples, a synthetic formation water solution was prepared to mimic the chemical composition of the formation water samples for use throughout the examples. The chemical composition of the synthetic formation water solution is displayed in Table 1. To form the synthetic formation water sample, 59,485.56 mg of sodium chloride (NaCl), 35,191.88 mg of calcium chloride ($CaCl_2*2H_2O$), 2848.62 mg. of strontium chloride ($SrCl_2*6H_2O$), and 710.21 mg of barium chloride ($BaCl_2$) were added to 600 g of distilled water.

Geochemical modeling using PHREEQC from the U.S. Geological Survey was performed to determine the sulfate concentration in the mixed fluid based on the ratio of seawater to formation water. The results of the geochemical modeling are displayed in Table 2. The modeling showed that the concentration of sulfates decreased with decreasing proportions of seawater and the lowest concentrations of sulfates in the mixed fluid occur when seawater makes up less than 10 vol. % of the mixed fluid. According to the modeling, a ratio of 10 vol. % seawater to 90 vol. % formation water results in a mixed fluid with less than 100 mg/L sulfates.

TABLE 2

| Seawater proportion [Vol. %] | Sulfate concentration [mg/L] |
|---|---|
| 5 | 1.3 |
| 7 | 3.1 |
| 8 | 8.3 |
| 9 | 41.1 |
| 10 | 94.9 |
| 20 | 256.4 |
| 30 | 521.7 |
| 40 | 919.9 |
| 50 | 1087.2 |
| 60 | 1331.7 |
| 70 | 1724.9 |
| 80 | 2441.4 |
| 90 | 3888.9 |
| 100 | 4922.0 |

Additionally, the geochemical modeling indicated that the highest total amount of precipitates would occur when the mixed fluid contains 40 vol. % seawater and 60 vol. % formation water. The model indicates that this ratio results in about 1.4 g of precipitates per liter of mixed fluid. Table 3 displays the total amount of precipitates and the mineralogical composition of the precipitates expected at various ratios of seawater to formation water. According to the model, celestite and barite form almost 100% of the precipitates when the mixed fluid includes 40 vol. % seawater and 60 vol. % formation water. The highest amount of precipitates (1.4 g per liter of mixed water) can be achieved by this mixing ratio.

TABLE 3

| Seawater proportion [%] | Total precipitates [mg per 1 L mixed water] | Barite [mg per 1 L mixed water] | Celestite [mg per 1 L mixed water] | Gypsum [mg per 1 L mixed water] | $SiO_2$ (a) [mg per 1 L mixed water] | $FeOH_3$ (a) [mg per 1 L mixed water] |
|---|---|---|---|---|---|---|
| 100 | 0.51 | 0.00 | 0.00 | 0.00 | 0.00 | 0.51 |
| 90 | 241.1 | 58.5 | 182.2 | 0.00 | 0.00 | 0.44 |

TABLE 3-continued

| Seawater proportion [%] | Total precipitates [mg per 1 L mixed water] | Barite [mg per 1 L mixed water] | Celestite [mg per 1 L mixed water] | Gypsum [mg per 1 L mixed water] | $SiO_2$ (a) [mg per 1 L mixed water] | $FeOH_3$ (a) [mg per 1 L mixed water] |
|---|---|---|---|---|---|---|
| 80 | 799.7 | 117.0 | 404.8 | 277.6 | 0.00 | 0.37 |
| 70 | 1142.3 | 175.4 | 615.8 | 350.8 | 0.00 | 0.28 |
| 60 | 1073.3 | 233.9 | 823.2 | 15.9 | 0.00 | 0.19 |
| 50 | 1266.8 | 292.4 | 974.3 | 0.00 | 0.00 | 0.06 |
| 40 | 1378.5 | 350.9 | 1014.6 | 0.00 | 13.0 | 0.00 |
| 30 | 1275.8 | 409.3 | 837.2 | 0.00 | 29.3 | 0.00 |
| 20 | 962.9 | 467.7 | 449.7 | 0.00 | 45.5 | 0.00 |
| 10 | 669.7 | 525.5 | 82.7 | 0.00 | 61.5 | 0.00 |
| 0 | 77.5 | 0.00 | 0.00 | 0.00 | 77.5 | 0.00 |

In order to obtain a sufficient amount of precipitates to perform various mineralogical analyses, seawater and synthetic formation water were mixed in a ratio of 40:60. Specifically, 400 g of the sampled seawater and 600 g of the synthetic formation water were added to a separating funnel. The mixed fluid immediately became turbid, having a milky appearance. This indicates the presence of suspended solids in the mixed fluid. Additionally, white particles were observed on the inner wall of the separating funnel. Since the precipitation of the solids began immediately after mixing the seawater and synthetic formation water, the kinetic inhibition on the precipitation of the sulfate bearing minerals appears to have no impact, or a negligible impact, on the precipitation. The solids suspended in the mixed fluid were allowed to settle for five days and then the solids were separated from the mixed fluid. The solids were dried in an incubator at 45° C. for three days. This process was repeated three times to obtain a total of 5 g of solids. The precipitation of the sulfate minerals from the mixed fluid resulted in a decrease in the sulfate concentration from 4,922 mg/L in the seawater to 1,136 mg/L in the mixed fluid, as shown in Table 1.

Figure 3A:
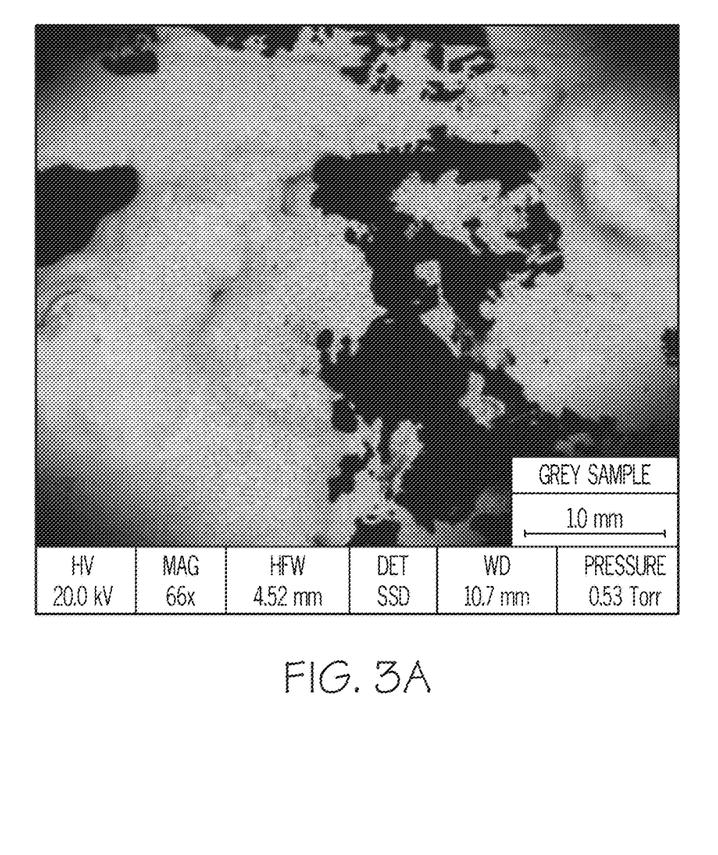
FIGS. 3A and 3B are environmental scanning electron microscopy (ESEM) images of the sulfate mineral precipitate, according to one or more embodiments described in this disclosure.
Figure 3B:
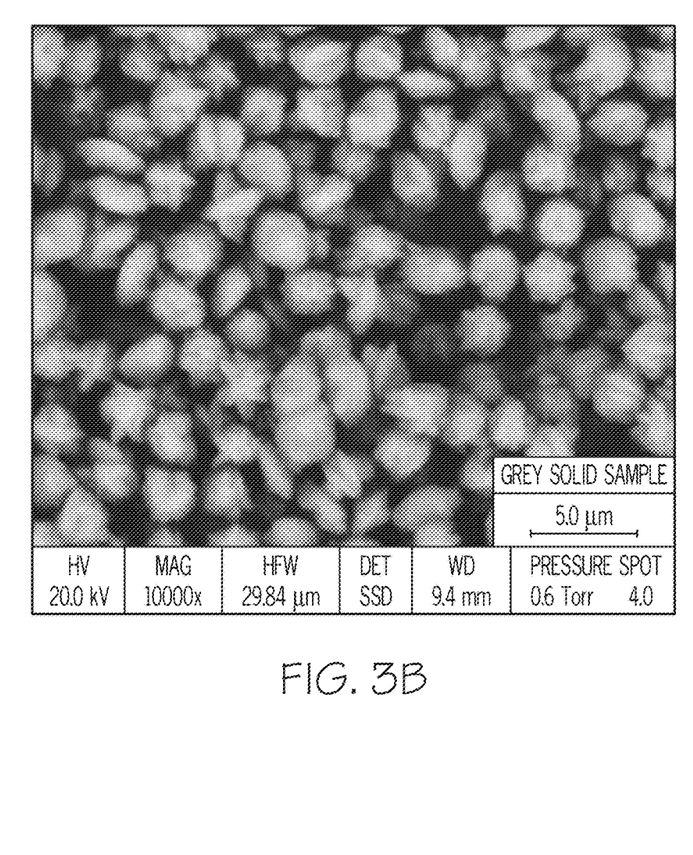

The solids were observed using an environmental scanning electron microscope (ESEM) and the solids had an almost uniform size with an average diameter of 5 μm. ESEM images of the solids are displayed in FIGS. 3A and 3B. FIG. 3A displays the solids at a relatively low magnification and FIG. 3B displays the solids at a higher magnification, such that individual particles are visible.

The solids were then analyzed by X-ray diffraction (XRD) and the results of this analysis are displayed in Table 4. The XRD analysis revealed that the solids primarily contained sulfate minerals, including barite, celestite and gypsum. Additionally, it is believed that an additional rinse of the precipitates could reduce the amount of halite observed in the solids to less than the 9% reported in Table 4.

TABLE 4

| Compound | Weight Percentage (wt. %) |
|---|---|
| Barite ($BaSO_4$) | 67 |
| Celestite ($SrSO_4$) | 10 |
| Gypsum ($CaSO_4 \cdot 2H_2O$) | 14 |
| Halite (NaCl) | 9 |

The solids were further analyzed by X-ray fluorescence (XRF) to determine the chemical composition of the solids. The results of the XRF analysis are displayed in Table 5.

TABLE 5

| Element | wt. % |
|---|---|
| O | 31.2 |
| Ba | 29.4 |
| S | 14.0 |
| Sr | 12.1 |
| Cl | 5.4 |
| Na | 3.5 |
| Ca | 3.3 |
| P | 0.4 |
| H | 0.3 |
| K | 0.2 |
| Si | 0.1 |
| Cs | 0.1 |
| Al | 0.1 |
| Mg | 0.1 |

Example 2—Comparison of Experimental Observations and Geochemical Modeling

To demonstrate that the geochemical modeling can accurately reproduce the chemical processes observed in the laboratory, results from the lab experiments were compared to the results obtained from the geochemical model. Table 6 displays the concentrations of various ions in the mixed fluid and compares the modeled values with the experimentally obtained values. Generally, the modeled and experimental values are within 10% of each other, suggesting that the modeling provides acceptable results.

TABLE 6

| Element | Measured concentration [mg/L] | Modeled concentration [mg/L] |
|---|---|---|
| $Cl^-$ | 63931 | 70314 |
| $Na^+$ | 30628 | 34942 |
| $Ca^{+2}$ | 9598 | 10803 |
| $Mg^{+2}$ | 811 | 1000 |
| $SO_4^{-2}$ | 1136 | 920 |
| $Sr^{+2}$ | 681 | 219 |
| $K^+$ | 250 | 286 |
| $Ba^{+2}$ | 0.5 | 0.3 |

Table 7 displays the concentrations of various ions in the solids and compares the modeled values with the experimentally obtained values. Table 7 shows agreement between the modeled values and experimental values for sulfate and calcium elements in the solids. However, modeled ratio of $Ba^{+2}$ to $Sr^{+2}$ was 0.60 while the experimentally obtained value was 1.55. The inconsistency between the modeled and experimental values could result from not rinsing the solids with distilled water before analysis. Additionally, the inconsistency could be a result of the high total dissolved solids of the formation water, which could affect the calculation of water-rock interactions using the database phreeqc.dat that uses the Pitzer set of thermodynamic data (Plummer and Parkhurst, 1990) that is commonly used for modeling high salinity water, but does not contain information on barium-bearing minerals. Thus, the model may not have been able to accurately predict the amount of barium in the solids that precipitated from the mixed fluid.

TABLE 7

| Element | Measured content in precipitates [wt %] | Modeled content in precipitates [wt %] |
|---|---|---|
| $Ba^{+2}$ | 29.4 | 16.8 |
| $Sr^{+2}$ | 12.1 | 27.9 |
| S in $SO_4^{-2}$ | 14.0 | 16.1 |
| $Ca^{+2}$ | 3.3 | 3.4 |

However, the experimental and observed values generally agreed, confirming that the processes observed in the laboratory may be reproduced by numerical modeling. As such, numerical modeling may be used to determine whether precipitates will form when seawater and formation water are mixed, the concentration of ions remaining in the mixed fluid, and the composition of the solids that precipitate from the mixed fluid.

According to a first aspect of the present disclosure, sulfate ions may be removed from seawater to form an injection fluid by a method comprising passing the seawater and formation water to a mixing tank. The seawater may comprise sulfate ions. The formation water may comprise barium ions. The seawater and formation water may be passed to the mixing tank in a ratio determined by a computerized geochemical model. The method may further comprise mixing the seawater and formation water to form a mixed fluid and passing the mixed fluid to a clarifier, wherein a barium sulfate precipitate may be formed and at least a portion of the barium sulfate precipitate may be separated from the mixed fluid. The method may further comprise passing the mixed fluid to a microfiltration system, wherein at least a portion of the barium sulfate precipitate may be removed from the mixed fluid to form an injection fluid.

A second aspect of the present disclosure may include the first aspect where the concentration of sulfate ions in the formation water may be less than 500 mg/L.

A third aspect of the present disclosure may include either of the first or second aspects where the concentration of barium ions in the formation water may be greater than 100 mg/L.

A fourth aspect of the present disclosure may include any of the first through third aspects where the concentration of sulfate ions in the seawater may be greater than 2000 mg/L.

A fifth aspect of the present disclosure may include any of the first through fourth aspects where the concentration of barium ions in the seawater may be less than 5 mg/L.

A sixth aspect of the present disclosure may include any of the first through fifth aspects where the concentration of sulfate ions in the injection fluid is less than 100 mg/L.

A seventh aspect of the present disclosure may include any of the first through sixth aspects where mixing the seawater and the formation water may occur in a mixing tank and the residence time of the seawater and formation water in the mixing tank may be from 0.1 to 1.0 hours.

An eighth aspect of the present disclosure may include any of the first through seventh aspects where the residence time of the mixed fluid in the clarifier may be from 1.0 to 24 hours.

A ninth aspect of the present disclosure may include any of the first through eighth aspects where the mixed fluid may comprise hydrocarbons and at least a portion of the hydrocarbons may be separated from the mixed fluid in the clarifier.

A tenth aspect of the present disclosure may include any of the first through ninth aspects where the barium sulfate precipitate may have an average diameter from 3 µm to 8 µm.

An eleventh aspect of the present disclosure may include any of the first through tenth aspects where the microfiltration system operates at a pressure from 0.3 bar to 2.1 bar.

A twelfth aspect of the present disclosure may include any of the first through eleventh aspects where at least 90 wt. % of the mixed fluid passed to the microfiltration system exits the microfiltration system as injection fluid.

A thirteenth aspect of the present disclosure may include any of the first through twelfth aspects where the injection fluid is substantially free of sulfate ions.

According to a fourteenth aspect of the present disclosure, an injection fluid may be produced by a method comprising analyzing samples of seawater and samples of formation water to determine a composition of the seawater and a composition of the formation water; analyzing samples of reservoir rock to determine a composition of the reservoir rock; and simulating an interaction of seawater, formation water, and reservoir rock using a computerized geochemical model to determine whether there is a potential for barite scale formation within a reservoir. If there is a potential for barite scale formation within the reservoir, the method may further comprise removing sulfate ions from the seawater by a method comprising mixing the seawater and formation water to form a mixed fluid. The seawater and formation water may be mixed in a ratio determined by the computerized geochemical model. The method may further comprise passing the mixed fluid to a clarifier, wherein sulfate minerals precipitate from the mixed fluid within the clarifier and the sulfate minerals comprise barite. Additionally, the method may comprise filtering at least a portion of the sulfate minerals from the mixed fluid to form an injection fluid, wherein the filtering occurs in a microfiltration system.

A fifteenth aspect of the present disclosure may include the fourteenth aspect where the sulfate minerals may further comprise one or more of celestite and gypsum.

A sixteenth aspect of the present disclosure may include either of the fourteenth or fifteenth aspects where analyzing the samples of seawater and the samples of formation water may comprise determining one or more of pH, conductivity, salinity, and total dissolved solids of the samples of seawater and the samples of formation water.

A seventeenth aspect of the present disclosure may include any of the fourteenth through sixteenth aspects where analyzing the samples of seawater and the samples of formation water may comprise determining a concentration of one or more of sodium, calcium, magnesium, potassium, strontium, barium, aluminum, boron, lithium, iron, chloride, bicarbonate, and sulfate in the samples of seawater and the samples of formation water.

An eighteenth aspect of the present disclosure may include any of the fourteenth through seventeenth aspects where analyzing the samples of reservoir rock may comprise performing at least one of X-ray diffraction analysis, X-ray fluorescence analysis, and scanning electron microscopy on the samples of reservoir rock.

A nineteenth aspect of the present disclosure may include any of the fourteenth through eighteenth aspects where the method may further comprise determining whether the samples of formation water are contaminated, and if so, analyzing uncontaminated samples of formation water.

A twentieth aspect of the present disclosure may include the nineteenth aspect where the samples of formation water may be contaminated by one or more of drilling fluids, completion brines, and stimulation acid.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

It will be apparent to those skilled in the art that various modifications and variations can be made to the present invention without departing from the spirit and scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A method for producing an injection fluid, the method comprising:
   analyzing samples of seawater and samples of formation water to determine a composition of the seawater and a composition of the formation water;
   analyzing samples of reservoir rock to determine a composition of the reservoir rock;
   simulating an interaction of seawater, formation water, and reservoir rock using a computerized geochemical model to determine whether there is a potential for barite scale formation within a reservoir;
   if there is a potential for barite scale formation within the reservoir, removing sulfate ions from the seawater by a method comprising:
     mixing the seawater and formation water to form a mixed fluid, wherein the seawater and formation water are mixed in a ratio determined by the computerized geochemical model;
     passing the mixed fluid to a clarifier, wherein sulfate minerals precipitate from the mixed fluid within the clarifier and the sulfate minerals comprise barite; and
     filtering at least a portion of the sulfate minerals from the mixed fluid to form an injection fluid, wherein the filtering occurs in a microfiltration system.

2. The method of claim 1, wherein the sulfate minerals further comprise one or more of celestite and gypsum.

3. The method of claim 1, wherein analyzing the samples of seawater and the samples of formation water comprises determining one or more of pH, conductivity, salinity, and total dissolved solids of the samples of seawater and the samples of formation water.

4. The method of claim 1, wherein analyzing the samples of seawater and the samples of formation water comprises determining a concentration of one or more of sodium, calcium, magnesium, potassium, strontium, barium, aluminum, boron, lithium, iron, chloride, bicarbonate, and sulfate in the samples of seawater and the samples of formation water.

5. The method of claim 1, wherein analyzing the samples of reservoir rock comprises performing at least one of X-ray diffraction analysis, X-ray fluorescence analysis, and scanning electron microscopy on the samples of reservoir rock.

6. The method of claim 1, wherein the method further comprises determining whether the samples of formation water are contaminated, and if so, analyzing uncontaminated samples of formation water.

7. The method of claim 6, wherein the samples of formation water are contaminated by one or more of drilling fluids, completion brines, and stimulation acid.

8. The method of claim 1, wherein the concentration of sulfate ions in the injection fluid is less than 100 mg/L.

9. The method of claim 1, wherein the injection fluid is substantially free from sulfate ions.

* * * * *